(12) United States Patent
Vincent

(10) Patent No.: US 10,228,885 B2
(45) Date of Patent: *Mar. 12, 2019

(54) DEALLOCATING PORTIONS OF DATA STORAGE BASED ON NOTIFICATIONS OF INVALID DATA

(71) Applicant: Amazon Technologies, Inc., Seattle, WA (US)

(72) Inventor: Pradeep Vincent, Kenmore, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/583,542

(22) Filed: May 1, 2017

(65) Prior Publication Data
US 2018/0039449 A1 Feb. 8, 2018

Related U.S. Application Data

(63) Continuation of application No. 13/857,968, filed on Apr. 5, 2013, now Pat. No. 9,639,296.

(51) Int. Cl.
*G06F 3/06* (2006.01)
*G06F 12/02* (2006.01)

(52) U.S. Cl.
CPC ............ *G06F 3/0665* (2013.01); *G06F 3/067* (2013.01); *G06F 3/0608* (2013.01);
(Continued)

(58) Field of Classification Search
CPC .... G06F 3/067; G06F 12/0253; G06F 12/023; G06F 3/0665; G06F 3/0604; G06F 3/0608
See application file for complete search history.

(56) References Cited

U.S. PATENT DOCUMENTS

| | | | | |
|---|---|---|---|---|
| 5,193,184 A | * | 3/1993 | Belsan | G06F 3/0601 707/999.2 |
| 6,092,168 A | * | 7/2000 | Voigt | G06F 3/0626 707/999.202 |

(Continued)

OTHER PUBLICATIONS

Field, G., et al., The Book if SCSI: I/O for the New Millennium, 2nd End., No Starch Press, San Francisco, CA 2000, 6 pages.
(Continued)

*Primary Examiner* — Glenn Gossage
(74) *Attorney, Agent, or Firm* — Knobbe, Martens, Olson & Bear, LLP

(57) ABSTRACT

Systems and methods are disclosed which facilitate management of thin provisioned data storage. Specifically, portions of thinly provisioned data stores may be deallocated when they contain invalid data, such as data deleted by a user. A user may transmit notifications, which may include delete notifications, such as TRIM commands, to a provider of the data store (or to the data store itself) that data has been deleted. A management component may modify the data store, or metadata corresponding to the data store, to reflect the deletion. The management component may further monitor portions of the data store to determine whether individual portions contain entirely invalid data. If so, the portion may be deallocated from the thin provisioned data store, resulting in more efficient thin provisioning. Deallocation may be enabled even where deletion notifications from a user do not correspond directly to allocated storage portions.

20 Claims, 9 Drawing Sheets

(52) U.S. Cl.
CPC ........ *G06F 3/0652* (2013.01); *G06F 12/0238* (2013.01); *G06F 12/0253* (2013.01); *G06F 12/023* (2013.01); *G06F 2212/1044* (2013.01); *G06F 2212/261* (2013.01); *G06F 2212/7204* (2013.01); *G06F 2212/7205* (2013.01); *G06F 2212/7207* (2013.01)

(56) References Cited

U.S. PATENT DOCUMENTS

| | | | |
|---|---|---|---|
| 6,507,911 B1* | 1/2003 | Langford | G06F 21/6209 713/193 |
| 7,865,586 B2* | 1/2011 | Cohn | H04L 41/0803 709/203 |
| 8,131,956 B2* | 3/2012 | Yamagami | G06F 3/0605 711/161 |
| 8,473,347 B1 | 6/2013 | Koningstein | |
| 9,558,111 B1* | 1/2017 | Balcha | G06F 12/0253 |
| 9,606,909 B1 | 3/2017 | Vincent | |
| 9,639,296 B1 | 5/2017 | Vincent | |
| 2002/0073408 A1* | 6/2002 | Hurich | G11C 16/102 717/168 |
| 2006/0020745 A1 | 1/2006 | Conley et al. | |
| 2006/0085471 A1* | 4/2006 | Rajan | G06F 3/0608 |
| 2009/0089516 A1* | 4/2009 | Pelts | G06F 3/0608 711/154 |
| 2009/0320056 A1 | 12/2009 | Wu et al. | |
| 2010/0082715 A1 | 4/2010 | Dohm et al. | |
| 2010/0125705 A1* | 5/2010 | Mehra | G06F 3/0608 711/114 |
| 2010/0211737 A1* | 8/2010 | Flynn | G06F 3/0616 711/114 |
| 2010/0223126 A1 | 9/2010 | Tung et al. | |
| 2010/0228822 A1 | 9/2010 | Cohen et al. | |
| 2010/0281080 A1* | 11/2010 | Rajaram | G06F 3/0608 707/813 |
| 2011/0060887 A1 | 3/2011 | Thatcher et al. | |
| 2011/0270685 A1 | 11/2011 | Marks et al. | |
| 2012/0011340 A1 | 1/2012 | Flynn et al. | |
| 2012/0254514 A1* | 10/2012 | Nishikubo | G06F 12/0246 711/103 |
| 2012/0265920 A1 | 10/2012 | Baron | |
| 2013/0275391 A1* | 10/2013 | Batwara | G06F 17/30085 707/689 |
| 2015/0074368 A1* | 3/2015 | Islam | G06F 3/0652 711/166 |

OTHER PUBLICATIONS

Bacon, D.F., et al., Controlling Fragmentation and Space Consumption in the Metronome, a Realtime Garbage Collector for Java, Proceedings of the ACM SIGPLAN Conference on Languages, Compilers, and Tools for Embedded Systems, Jun. 11-13, 2003, San Diego, CA, 12 pages.

* cited by examiner

DEALLOCATING PORTIONS OF DATA STORAGE BASED ON NOTIFICATIONS OF INVALID DATA

CROSS-REFERENCE TO RELATED APPLICATION

This application is a continuation of U.S. patent application Ser. No. 13/857,968, entitled DEALLOCATING PORTIONS OF DATA STORAGE BASED ON NOTIFICATIONS OF INVALID DATA, and filed Apr. 5, 2013, now U.S. Pat. No. 9,639,296.

BACKGROUND

Generally described, computing devices utilize a communication network, or a series of communication networks, to exchange data. Companies and organizations operate computer networks that interconnect a number of computing devices to support operations or provide services to third parties. In some instances, computing devices may be configured to provide data storage services, enabling users to store information remotely on the data storage service. Such data storage services may reduce a need for users to maintain their own storage, or may enable off-site data storage.

In general, each user of a data storage service may be provided with a remotely accessible data store configured to store desired information. In order to reduce costs associated with data storage services, these data stores may be implemented as virtual data stores hosted on a physical data store. For example, a physical computing device having a one terabyte hard disk drive (HDD) may host multiple, distinct one hundred gigabyte drives, each accessible to a different user. Virtualization may therefore reduce the number of physical data storage devices needed to support a large number of users, thereby reducing costs and increasing availability of data storage services.

In some instances, virtualized data stores (such as those offered by data storage services) may be configured such that the virtual data store appears to have a larger storage capacity than is actually allocated. Such a configuration is sometimes referred to as "thin provisioning." Generally, the larger storage capacity of a thin provisioned virtual data store corresponds to a capacity agreed upon by the data storage service and a user (e.g., as defined in a service contract). However, the actual storage capacity allocated to a thin provisioned virtual data store by a data storage service is generally related to the amount of data stored within the virtual data store. For example, assume that a thin provisioned virtual data store has an agreed upon larger storage capacity of 10 gigabytes. Further, assume that the user (or set of users) that is associated with the virtual data store has only stored only 1 gigabyte of information. Under these conditions, a data storage service may allocate 1 gigabyte or just over 1 gigabyte of storage on an underlying physical storage device. As a user transmits additional data to the virtual data store, the allocated size of the virtual data store may be increased. For example, if an additional 1 gigabyte of information is transmitted for storage, the virtual data store may be allocated an additional gigabyte, such that total allocation would equal at least 2 gigabytes. However, from the perspective of the user (or set of users) the apparent capacity would remain at 10 gigabytes of storage. By utilizing thin provisioning, data storage services may reduce the total physical data stores required to support users.

DETAILED DESCRIPTION

Figure 1:
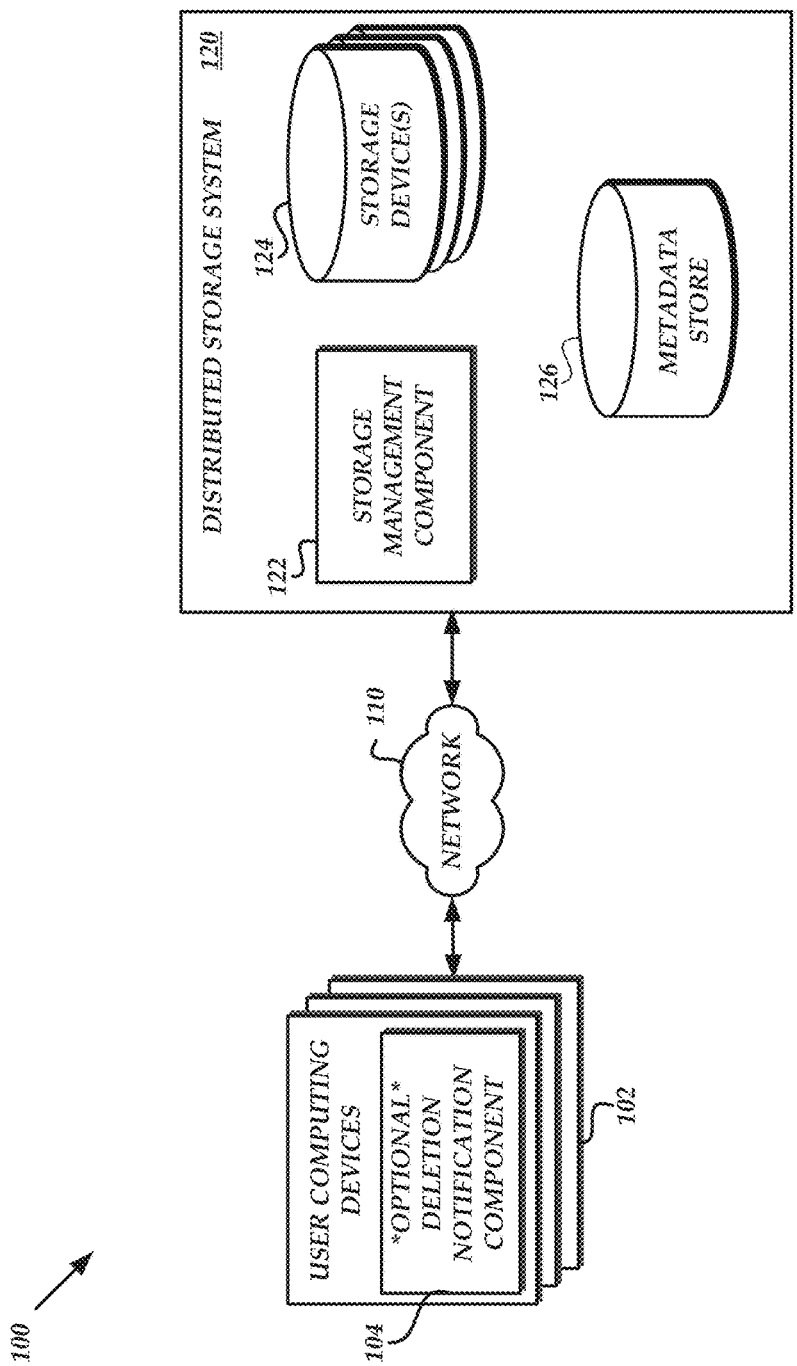
FIG. 1 is a block diagram depicting an illustrative operating environment in which a distributed storage system enables users to utilize thin provisioned virtual data stores, and in which the distributed storage system may monitor usage of the virtual data stores in order to deallocate storage portions including invalid data, such as deleted data.

Generally described, aspects of the present disclosure relate to managing provisioned virtual data stores. These data stores may be provided, for example, by a network accessible data storage service. Specifically, aspects of the present disclosure enable deallocation of storage from a thin provisioned data store in response to a determination that the portion contains only invalid data, such as data deleted by a user. Illustratively, a thin provisioned data store may be monitored to determine deletions of data by a corresponding user. In some instances, such monitoring may be facilitated in part by deletion notifications transmitted by a user computing device. Thereafter, portions of the thin provisioned data store may be analyzed to determine whether they include only invalid data. As used herein, invalid data may include any data known to be irrelevant to a user computing device, including data never written by a user and data indicated to be deleted by a user. For example, invalid data may include data that is stored in an area of storage allocated to a specific user computing device but that was never transmitted by the user computing device to the storage area. Further, invalid data may include data deleted by users, or otherwise indicated as unnecessary.

When a portion of a storage device previously allocated to a user contains entirely invalid data, the portion may be deallocated from the thin provisioned data store. Deallocation may at least partially disassociate the portion from the user (or a virtual data store corresponding to the user), such that the deallocated portion is available for storage of other information. Such deallocation may reduce the effective storage requirements of a virtual data store, enabling more or larger virtual data stores to be provided by the same underlying physical storage devices.

In some embodiments, user computing devices utilizing thin provisioned data stores may include a deletion notification component configured to notify the thin provisioned data store after deletion of data. Such a deletion notification component may be included, for example, in a device driver associated with the thin provisioned data store (e.g., and installed on a user computing device), or in other software associated with the thin provisioned data store. In other embodiments, the deletion notification component may correspond to hardware or firmware of a user computing device. Deletion notifications may be generated by the deletion notification component in response to a deletion of data corresponding to one or more predefined data segments. These data segments may be defined, for example, based on a storage mechanism utilized by the user computing device. In one embodiment, data segments may correspond to data storage "blocks" addressed by the user computing device. On deletion of one or more such segments, the deletion notification component may transmit a notification to the thin provisioned data store indicative of the deleted segments. Where segments correspond to blocks, the deletion notification may include the logical block address (LBA) for each deleted block.

In some embodiments, deletion notifications may correspond to "Data Set Management" commands, as defined within the ATA/ATAPI command set. For example, deletion notifications may be generated as part of a TRIM function of a "Data Set Management" command, which may hereafter be generally referred to as "TRIM commands." TRIM commands are generally implemented in order to facilitate communication between a computing device and a solid state drive (SSD). However, TRIM commands may be utilized as deletion notifications within the context of the present application regardless of whether underlying physical storage corresponds to an SSD or other data storage device. In some embodiments, a thin provisioned data store may masquerade as an SSD in order to provoke TRIM commands from a user computing device.

In other embodiments, deletion notifications may correspond to other activities of the user computing device which indicate data is invalid. For example, in some instances user computing devices may be configured to securely delete data from a thin provisioned data store. Such secure deletion may include overwriting deleted data with a known pattern of bits, such as repeating zeros. In such instances, a thin provisioned data store may detect secure deletion of data, and mark the data as deleted. In this manner, deletion notifications from user computing devices may be inferred based on activity of the user computing device. Other activities or actions of a user computing device may also be utilized to infer deletion of data. For example, a user computing device may establish an expiration point for specified data, such that after the expiration point, the data may be considered invalid. Establishment of such expiration points may also correspond to a deletion notification. In some embodiments, a deletion notification component on the user computing device may not be required.

As noted above, storage may be allocated to thin provisioned data stores in response to requests to store data by a user computing device. For instance, on creation, a thin provisioned data store may be allocated no storage space, such that the actual capacity (e.g., the capacity provided by the entirety of allocated portions) of the data store is zero. In response to a request to write data to the data store, additional storage may be allocated to the data store. The amount of allocated storage may be dependent in part on a configuration of the thin provisioned data store. For example, a thin provisioned data store may be configured to allocate storage in increments of a predefined size (e.g., 4 megabytes ["MB"]). Such predefined increment sizes may be defined by a provider of the thin provisioned data store according to any number of preferences, such as complexity of allocation, performance of thin provisioned data stores, and the type of data stored within the thin provisioned data store. In some instances, portions of a thin provisioned data store corresponding to a predefined increment size may be referred to as "chunks," or more generally as "allocated portions."

Subsequent to allocation of one or more portions of a storage device to a user as a virtual data store, the user may interact with the virtual data store in order to write data. For example, the user may request storage of one or more files within the virtual data store. These files may then be written to the allocated portions of an underlying physical storage device. Thereafter, the user or other users (potentially subject to user permissions) may retrieve the files from the virtual data store. If user requests to write data exceed the portions of storage allocated to the user's virtual data store, additional portions may be allocated, thereby expanding the physical storage requirements of the virtual data store.

In accordance with aspects of the present disclosure, during interaction with a virtual data store, a user computing device may transmit deletion notifications indicating one or more segments (as addressed by the user computing device) of the virtual data store that include invalid data (e.g., data considered deleted by the user computing device). However, the segments indicated within deletion notifications, which may be defined by the user computing device or a standard used by the user computing device, may not match the portions of storage allocated to the virtual data store. For example, deletion notifications may occur with respect to individually addressable blocks of data of a predetermined size (e.g., 512 bytes, 2 kilobytes ["KB"], 4 KB). However, portions may be allocated to a virtual data store in a relatively larger size (e.g., 4 MB). Where a deletion notification indicates that an entire allocated portion includes invalid data, it may be possible to deallocate the portion, reducing the actual capacity (e.g., the total capacity of all allocated portions) of the corresponding virtual data store.

However, due to these potential differences between the size of allocated portions of a thin provisioned data store and the segments of data indicated in a deletion notification, it may not be practical or possible to deallocate storage portions in response to each deletion notification. For example, an allocated portion may have a maximum capacity of 4 MB, and be addressed by a user computing device at a 4 KB granularity. Accordingly, 1024 individual 4 KB segments may be addressable within the allocated portion. A user computing device may write data to each 4 KB segment. Thereafter, the user computing device may transmit a deletion notification indicating that individual segments within the allocated portion have been deleted. However, because the remaining segments (e.g., those not indicated within the deletion notification) still include valid data, deallocation of an entire allocated portion in response to the deletion notification would result in data loss. Accordingly, deallocation of allocated portions in direct response to deletion notifications may therefore be undesirable.

In order to facilitate deallocation of allocated portions independent of the granularity of deletion notifications, a provider of a thin provisioned data store, such as a network-accessible storage system, may maintain a record of data deleted from the thin provisioned data store. For example, where deletion notifications correspond to blocks of the data store, a record may be maintained indicating each deleted or invalid block and its relation to an allocated portion of an underlying storage device. In one embodiment, the record may correspond to metadata of the thin provisioned data store, such as flags associated with addressable segments of the data store, or an array of status indicators for each addressable segment. In another embodiment, the record may correspond to data within the data store itself. For example, deleted addressable segments of data within the data store may be overwritten with a known pattern (e.g., repeating zeros) in order to indicate invalid data. Writing of such a pattern may be facilitated by the user computing device (e.g., utilizing secure deletion mechanisms) or by a provider of the thin provisioned data store (e.g., in response to a TRIM command).

Thereafter, utilizing the record of data deleted from the thin provisioned data store, the data store may be analyzed to determine whether any allocated portion includes only invalid data. Where such an allocated portion is detected, the portion may be deallocated. Deallocation of the portion would therefore result in a reduction of actual storage required by the thin provisioned data store, while maintaining all valid user data. Accordingly, the overall efficiency of thin provisioned data stores may be improved. In addition, because embodiments of the present disclosure enable deallocation independent of storage segments referenced by deletion notifications, the need to configure user computing devices may be reduced or negated. For example, user computing devices utilizing TRIM commands or secure deletion mechanisms may be compatible with deallocation without any reconfiguration. Still further, because embodiments of the present disclosure enable deallocation independent of allocated portion size, little or no modification may be required to existing provisioning mechanisms.

With reference now to FIG. 1, a block diagram is shown depicting an illustrative operating environment 100 in which a distributed storage system 120 enables users to interact with thin provisioned data stores. Moreover, in accordance with aspects of the present disclosure, the distributed storage system 120 may monitor deletion of data from thin provisioned data stores, and deallocate data storage portions that do not contain valid data. As illustrated in FIG. 1, the operating environment 100 includes one or more user computing devices 102 in communication with the distributed storage system 120 via a network 110. A user computing device 102 may be any computing device, such as personal computer (PC), kiosk, thin client, home computer and dedicated or embedded machine. Further examples may include a laptop or tablet computers, servers, personal digital assistant (PDA), hybrid PDA/mobile phones, mobile phones, electronic book readers, set-top boxes, cameras, digital media players and the like. The network 110 may be any wired network, wireless network or combination thereof. In addition, the network 110 may be a personal area network, local area network, wide area network, cable network, satellite network, cellular telephone network or combination thereof. Protocols and components for communicating via any of the other aforementioned types of communication networks are well known to those skilled in the art of computer communications and thus, need not be described in more detail herein.

The user computing devices 102 may further include a deletion notification component 104 configured to notify the distributed storage system upon deletion of data by the user computing device 102. By default, a user computing device 102 may generally not inform storage devices on deletion of data. For example, many commonly used file systems do not explicitly communicate deleted data segments to an underlying storage device. Rather, these file systems utilize metadata to determine whether data is invalid, and whether the data may therefore be overwritten. However, the metadata utilized by these file systems may be unavailable to or unusable by the underlying storage device. Accordingly, a deletion notification component 104 may be included within or provided to user computing devices 102. The deletion notification component 104 may be configured to transmit to an underlying data store a deletion notification indicating each segment of the data store deleted by the user computing device 102. As will be described below, such notifications may be utilized to deallocate unused storage within a thin provisioned data store. Segments indicated within deletion notifications may be determined based at least in part on a configuration of the user computing device 102 or the deletion notification component 104. For example, deletion notifications may indicate deletion of specific blocks of storage (e.g., according to a logical block address). In some embodiments, the deletion notification component 104 or the format of deletion notifications generated by the deletion notification component 104 may be impractical or impossible to modify by the distributed storage system 120.

A deletion notification component 104 may be implemented by any combination of software, firmware, or hardware on a user computing device 102, including but not limited to a user computing device 102's operating system, applications, device drivers, and disk controllers. In one embodiment, a deletion notification component 104 may correspond to components of the user computing device 102 that enable the use of TRIM commands. In another embodiment, a deletion notification component 104 may correspond to components of the user computing device 102 that enable secure deletion of data by overwriting data with a known pattern. As described above, the writing of such a known pattern may constructively notify a data store (e.g., within the distributed storage system 120) that the underlying data has been deleted. In yet more embodiments, the deletion notification component 104 may be specially configured software (e.g., a driver or application) or firmware implemented by the user computing device 102. In some such embodiments, the deletion notification component 104 may be transmitted to the user computing device 102 by the distributed storage system 120.

The distributed storage system 120 is illustrated in FIG. 1 as operating in a distributed computing environment comprising several computer systems that are interconnected using one or more networks. More specifically, the distributed storage system 120 may include a storage management component 122, one or more storage devices 124 and one or more metadata stores 126, each of which will be discussed in greater detail below. However, it may be appreciated by those skilled in the art that the distributed storage system 120 may have fewer or greater components than are illustrated in FIG. 1. In addition, the distributed storage system 120 could include various Web services and/or peer-to-peer network configurations.

Any one or more of the storage management component 122, storage devices 124, and data stores containing metadata store 126, may be embodied in a plurality of components, each executing an instance of the storage management component 122, storage devices 124, and metadata store 126. A server or other computing component implementing any one of the storage management component 122, storage devices 124 and metadata store 126 may include a network interface, memory, processing unit and computer readable medium drive, all of which may communicate with each other by way of a communication bus. For example, an included network interface may provide connectivity over the network 110 and/or other networks or computer systems. A processing unit (as included in any of the components discussed above) may communicate to and from memory containing program instructions that the processing unit executes in order to operate the storage management component 122, storage devices 124 and metadata store 126. An included memory may generally include random access memory ("RAM"), read-only memory ("ROM"), other persistent and auxiliary memory and/or any non-transitory computer-readable media.

Moreover, in some embodiments, any one or more of the storage management component 122, storage devices 124 and metadata store 126 may be implemented within a hosted computing environment. As used herein, a hosted computing environment includes a collection of rapidly provisioned and released computing resources. Such computing resources may be referred to as host computing resources. The host computing resources may include a number of computing, networking and storage devices in communication with one another. In some embodiments, the computing, networking and storage devices may correspond to physical devices. In other embodiments, the computing, networking and storage devices may correspond to virtual devices, such as virtual machine instances, implemented by one or more physical devices. In still other embodiments, the computing, networking and storage devices may correspond to a combination of both virtual devices and physical devices. One example of a hosted computing environment is given in U.S. Pat. No. 7,865,586, entitled "Configuring Communications Between Computing Nodes," and issued Jan. 4, 2011, which is hereby incorporated by reference in its entirety. A hosted computing environment may also be referred to as a cloud computing environment.

With further reference to FIG. 1, illustrative components of the distributed storage system 120 will now be discussed. Specifically, the one or more storage devices 124 may correspond to base storage devices (virtual or physical) configured to store data corresponding to a number of virtual data stores accessible to user computing devices 102. For example, the storage devices 124 may include a collection of hard disk drives (HDDs), SSDs, virtual disk drives, tape drives, network attached storage (NAS) devices, or any other persistent or substantially persistent storage component. In conjunction with the storage management component 122, the storage devices 124 may provide a plurality of thin provisioned virtual storage devices to user computing devices 102. Specifically, the storage management component 122 may be configured to modify or format the storage devices 124 to facilitate division of the storage capacity provided by the storage management component 122 among a plurality of user computing devices. The storage management component 122 may further be configured to allocate portions of the storage devices 124 to individual user computing devices 102 and to maintain a record of associations between portions of the storage devices 124 and individual user computing devices 102. Allocated portions of the storage devices 124 may correspond to a fixed portion size. Such a portion size may be configured by the distributed storage system 120 according to a number of criteria, such as contractual obligations, efficiency of the distributed storage system 120, characteristics of the storage devices 124, etc. Illustratively, the storage management component 122 may be configured to allocate a number of 4 MB portions of the storage devices 124 to user computing devices 102 in response to write requests.

In addition, the storage management component 122 may be configured to enable interaction between the user computing devices 102 and the provisioned data stores. Illustratively, the storage management component 122 may be configured to receive commands via the network 110, and to read, write, modify, or delete data on the storage devices 124 in response to the commands. The storage management component 122 may further be configured to communicate with the user computing devices 102 in order to configure the user computing device 102 or a provided thin provisioned data store. For example, in some embodiments, the storage management component 122 may be configured to report to the user computing device 102 that a thin provisioned data store is an SSD device, regardless of the actual physical characteristics of the storage devices 124 implementing a virtual data store. Illustratively, reporting that a thin provisioned data store is an SSD device may provoke the user computing device 102 to utilize TRIM commands, thereby enabling deallocation of unused portions of the thin provisioned data store.

Still further, in accordance with aspects of the present disclosure, the storage management component 122 may be configured to receive deletion notifications from the user computing device 102 (e.g., from the deletion notification component 104), and to record deletion of segments of a thin provisioned data store. In one embodiment, the storage management component 122 may determine deleted segments based at least in part on the deletion notification, and modify metadata associated with a corresponding thin provisioned data store to reflect deletion. In one embodiment, such metadata may correspond to flags associated with segments of the thin provisioned data store. For example, a flag may be associated with individual addressable segments (or groups of such segments) of the thin provisioned data store indicating whether the associated segment contains valid data (e.g., written by the user computing device 102 and not deleted). Each time a write request is received from a user computing device 102, the storage management component 122 may modify the metadata to reflect that the written-to segments are valid. Each time a deletion notification is received from the client computing device, the storage management component 122 may modify the metadata to reflect that the segments indicated by the request are invalid (e.g., deleted). The metadata corresponding to thin provisioned data stores may be maintained within metadata store 126. Though shown as distinct from the storage devices 124, in some embodiments, the metadata store 126 may be implemented by the storage devices 124.

In another embodiment, the storage management component 122 may be configured to record deletion of segments of thin provisioned data stores by modifying the thin provisioned data stores themselves. For example, the storage management component 122 may be configured to, in response to a deletion notification, write a known pattern of bits to the segments identified within the deletion notification. Illustratively, the storage management component 122 may write a pattern of repeating zeros to each deleted segment, to indicate the segment contains no valid data. By writing such a pattern directly to deleted segments, there may be no need to maintain metadata regarding deletion of segments. Accordingly, in some such embodiments, the metadata store 126 may be omitted.

Still further, the storage management component 122 may be configured to analyze the thin provisioned data stores (as implemented by the storage devices 124) to determine whether any allocated portion of a thin provisioned data store contains only invalid data. As noted above, allocated portions may be determined based on configuration of the distributed storage system 120. For example, allocated portions may correspond to a set of predetermined, 4 MB portions of the storage devices 124. Because the size of segments indicated within a notification request and the size of allocated portions may be distinct, it may be possible for an allocated portion to contain a combination of valid and invalid data. Due to such a possibility, it may be undesirable to simply deallocate portions in response to every deletion notification. Rather, the storage management component 122 may analyze thin provisioned data stores or metadata regarding such data stores in order to determine allocated portions that contain only invalid data. On determination of such an allocated portion, the storage management component 122 may deallocate the portion, thereby freeing the portion for allocation to another user computing device 102.

Figure 2A:
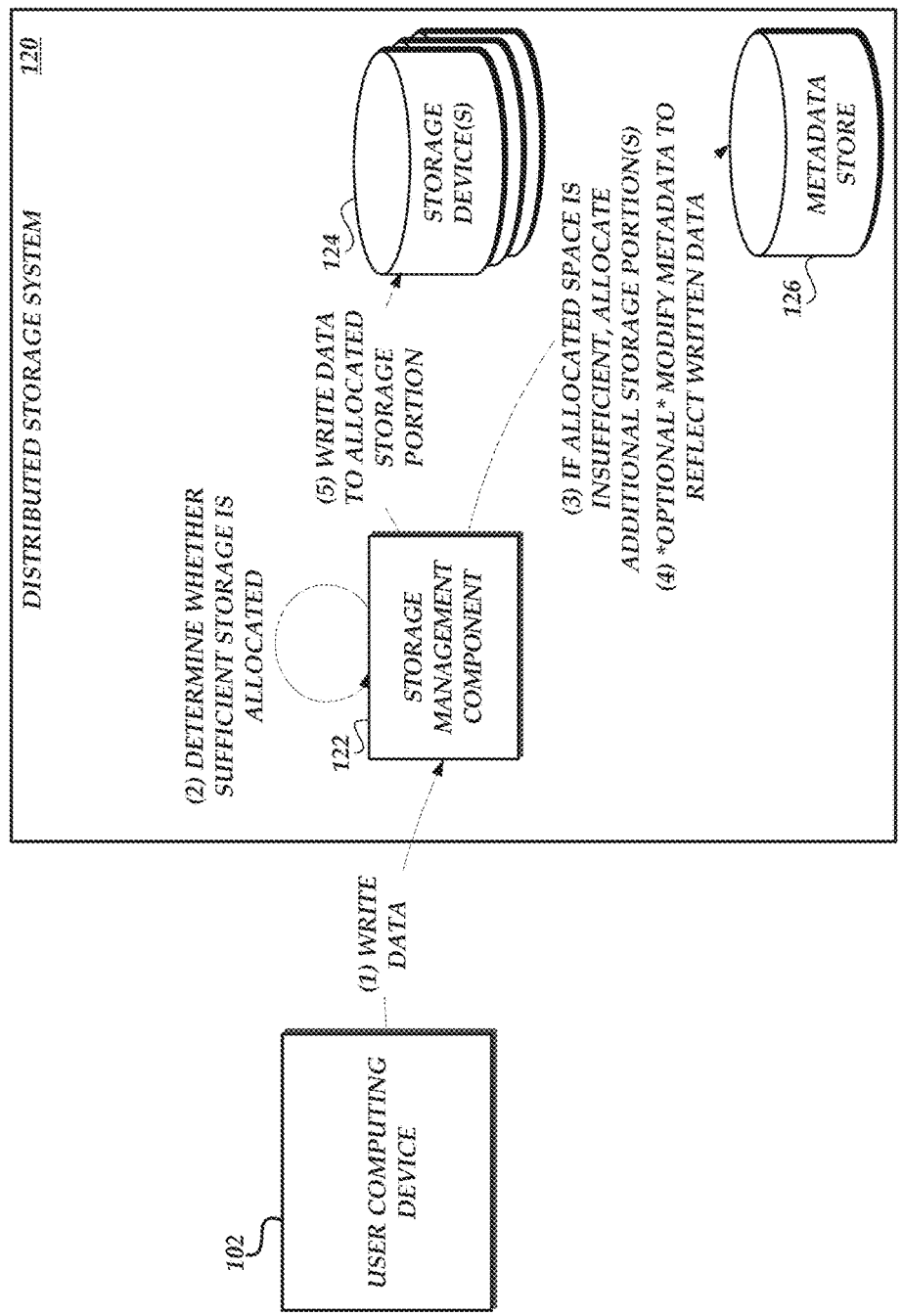
FIG. 2A is a block diagram depicting the storage of data to a thin provisioned virtual data store by a user computing device of FIG. 1, including the allocation of a storage portion to the thin provisioned virtual data store.
Figure 2B:
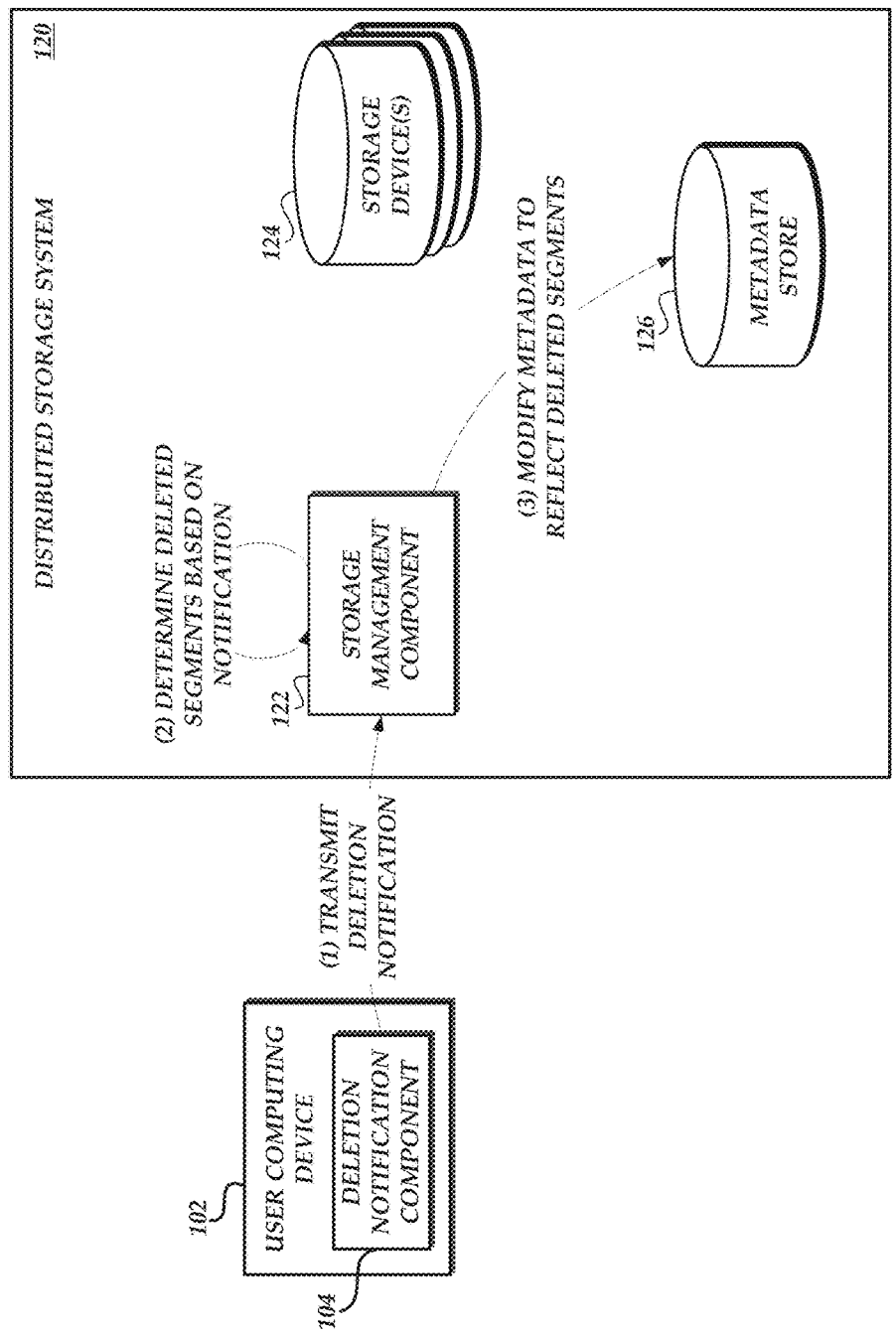
FIG. 2B is a block diagram depicting the reception of a deletion notification from a user computing device of FIG. 1, and the modification of metadata corresponding to a thin provisioned virtual data store to reflect the deletion.
Figure 2C:
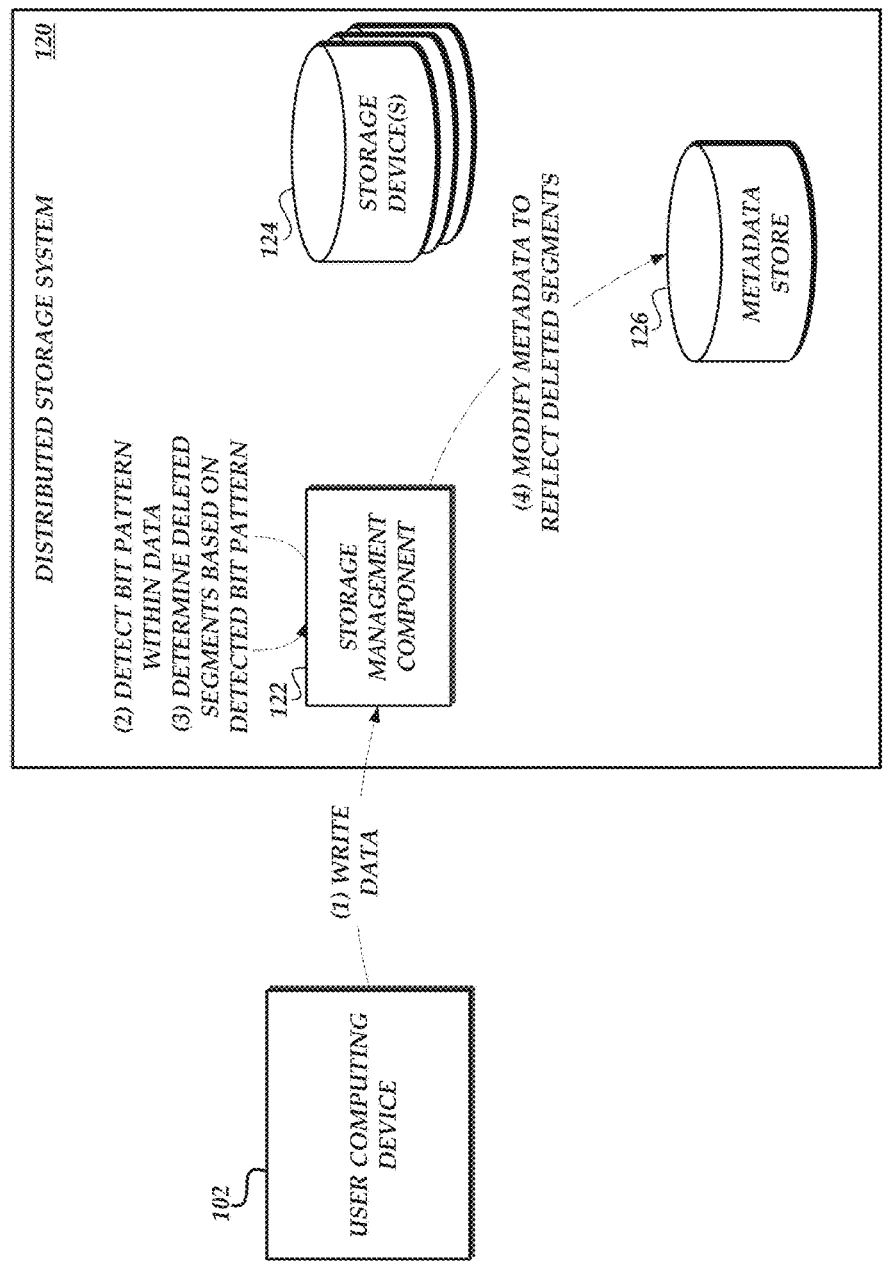
FIG. 2C is a block diagram depicting the reception of a request to write data to a thin provisioned virtual data store from a user computing device of FIG. 1, detection of data deletion based on the request, and modification of metadata corresponding to a thin provisioned virtual data store to reflect the deletion.
Figure 2D:
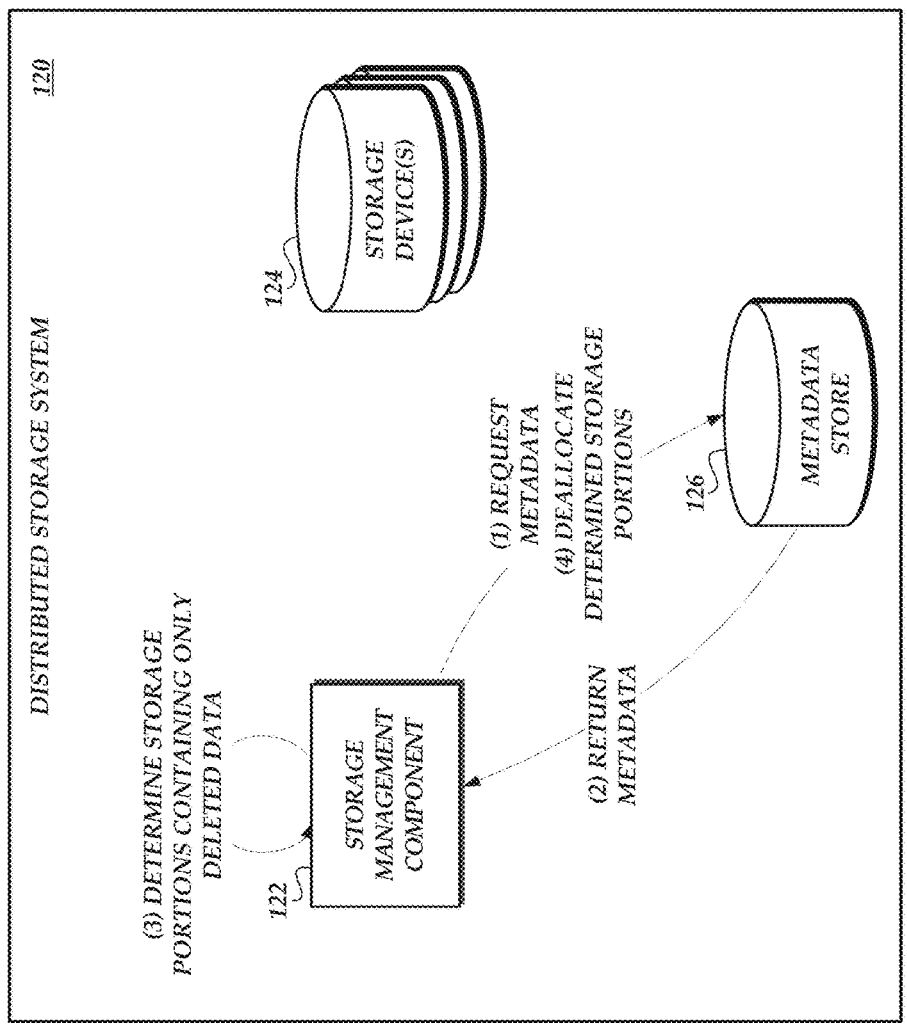
FIG. 2D is a block diagram depicting the monitoring of metadata corresponding to a thin provisioned virtual data store by the distributed storage system of FIG. 1, the detection of an allocated storage portion containing invalid data, and the deallocation of the storage portion.
Figure 2E:
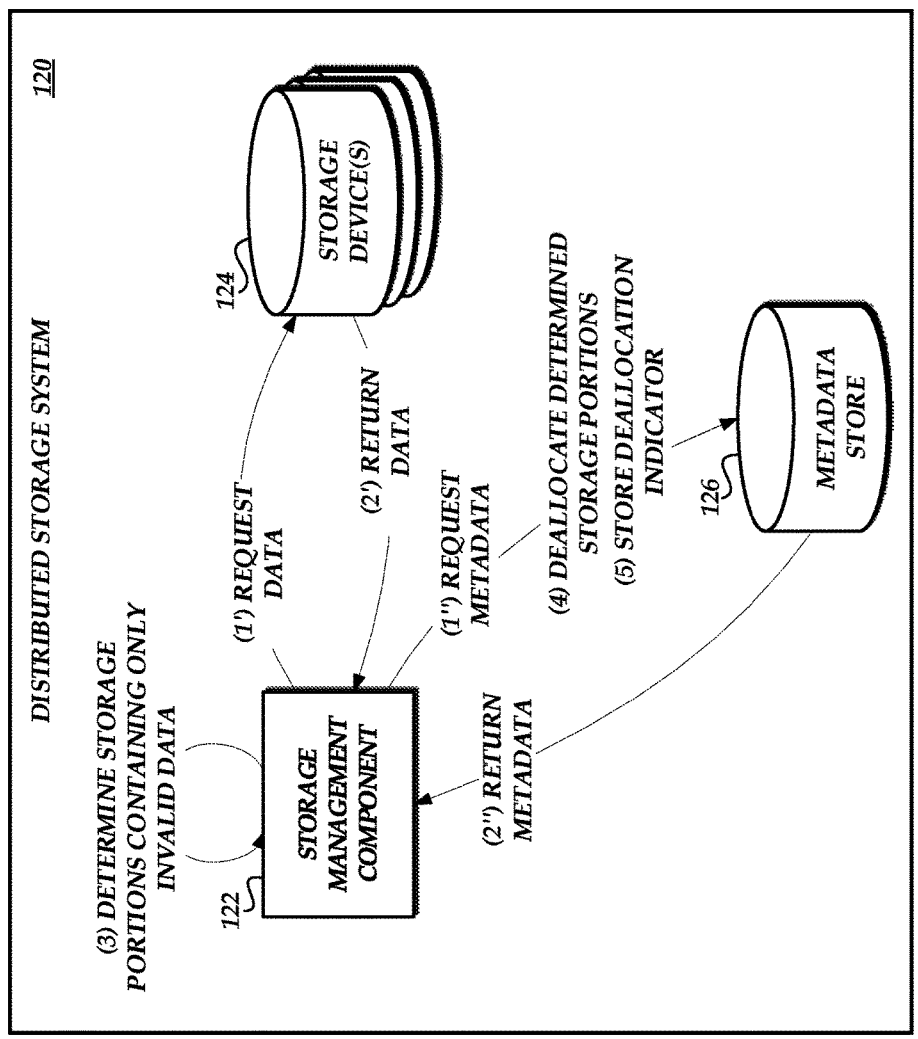
FIG. 2E is a block diagram depicting the monitoring of data of a thin provisioned virtual data store by the distributed storage system of FIG. 1, the detection of an allocated storage portion containing invalid data, and the deallocation of the storage portion.
Figure 2F:
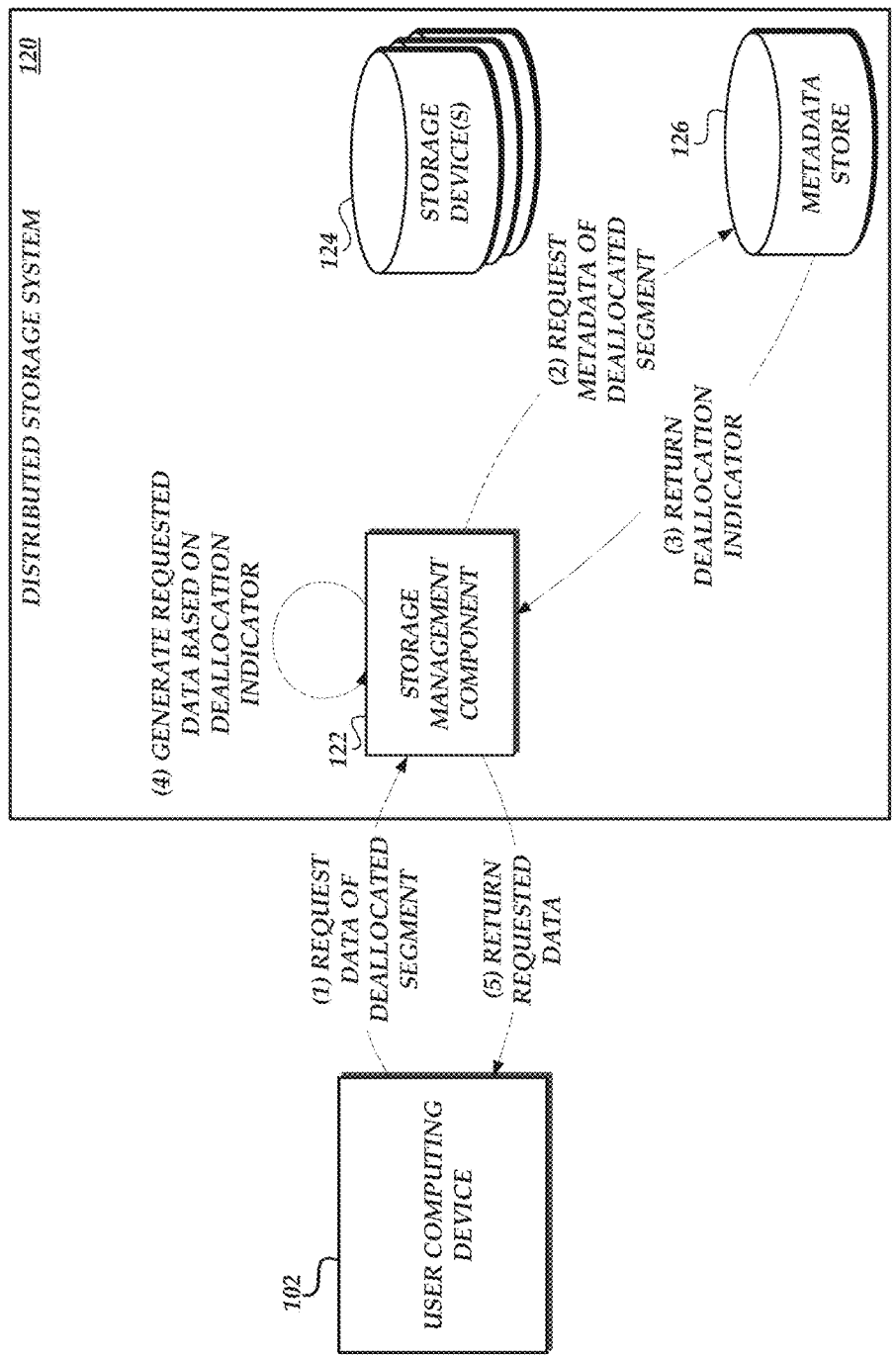
FIG. 2F is a block diagram depicting a request from a user computing device of FIG. 1 to read previously deallocated data and fulfillment of the request based on a bit pattern deallocation indicator.

With reference to FIGS. 2A-2F, illustrative interactions will be described for allocating a portion of storage devices 124 in response to a user request, monitoring interaction with the allocated portion, deallocating the portion in response to a determination that the portion contains no valid data, and fulfilling user requests for data previously held within a deallocated portion. Specifically, FIG. 2A depicts an illustrative interaction for receiving a write request from a user computing device 102, allocating a portion of the storage devices 124 to the user computing device 102, and writing the requested data to the allocated portion. FIG. 2B depicts an illustrative interaction for monitoring the allocated portion, and more specifically, for receiving one or more deletion notifications corresponding to an allocated portion and modifying metadata associated with the allocated portion to reflect such deletion. FIG. 2C depicts an illustrative interaction for monitoring the allocated portion, and more specifically, for determining deletion of one or more segments of an allocated portion based on detection of defined bit patterns and modifying metadata associated with the allocated portion to reflect such deletion. FIG. 2D depicts an illustrative interaction for analyzing metadata corresponding to allocated portions, and deallocating portions containing only invalid data. FIG. 2E depicts an illustrative interaction for analyzing data within an allocated portion, and deallocating portions containing only invalid data. FIG. 2F depicts an illustrative interaction for fulfilling a user request to read data previously stored within a deallocated portion. Though each of the illustrative interactions of FIGS. 2A-2F could occur independently or in any order, these illustrative interactions are described in sequence for simplicity and ease of description.

With reference to FIG. 2A, an illustrative interaction for servicing a data write request from a user computing device 102, including allocation of a portion of storage devices 124 to facilitate the data write request, will be described. Specifically, at (1), a user computing device 102 may transmit a write request, including data requested to be written, to the distributed storage system 120 (e.g., to the storage management component 122). Such a request may be transmitted according to any number of known protocols, including but not limited to hypertext transfer protocol (HTTP), secure HTTP (HTTPS), file transfer protocol (FTP), any number of storage interaction protocols (e.g., as defined by the ATA or SCSI standards), or any combination thereof. The write request may be directed at a thin provisioned data store provided by the distributed storage system 120 (e.g., as implemented within the storage devices 124).

Thereafter, at (2), the storage management component 122 may determine whether sufficient storage is allocated to the thin provisioned data store to service the write request. For example, the thin provisioned data store may correspond to allocated portions of the storage devices 124 that have sufficient capacity to contain the data within the write request. In such an instance, the storage management component 122 may determine that no additional portions need be allocated. However, for the purposes of discussion of FIG. 2A, it will be assumed that at least one additional portion of the storage devices 124 must be allocated to the user computing device 102 in order to service the write request. Accordingly, at (3), the storage management component 122 may allocate sufficient portions of the storage devices 124 to the user computing device. Such allocation may include, for example, modification of information within the metadata store 126 (or other data stores not shown in FIG. 2A) to reflect the allocated portions of the storage devices 124. Allocation of portions of storage devices in accordance with thin provisioning is well known within the art, and therefore will not be discussed in detail herein.

Subsequent to allocating sufficient portions of the storage devices 124, the storage management component 122 may, at (4), modify metadata corresponding to the allocated portions (as stored within the metadata store 126) to reflect that segments within the allocated portions have been written to, and therefore contain valid data. In one embodiment, modification of metadata may include modifying a flag associated with each written-to segment. In addition, at (5), the storage management component 122 may optionally write the data corresponding to the write request to the storage devices 124. As will be appreciated by one skilled in the art, the user computing device 102 may thereafter interact with the distributed storage system 120 to read, modify or delete the written data. Accordingly, the distributed storage system 120 interacts with the user computing device 102 in a manner similar to traditional storage devices (e.g., HDDs, SSDs, tape drives, NAS devices). Though modification of metadata is described herein as prior to writing of data to the storage devices 124, modification of metadata may occur at any point subsequent to receipt of the write request, and either prior, simultaneous, or subsequent to writing of the data to the storage devices 124. Moreover, as described above, in some embodiments metadata may not be required in order to record written data. For example, the storage management component 122 may be configured to recognize any data not corresponding to a known pattern (e.g., repeating zeros) as valid data. In such embodiments, it may therefore be unnecessary to maintain metadata, and as such, interaction (4) may be omitted.

With reference to FIG. 2B, an illustrative interaction for receiving deletion notifications corresponding to allocated portions of storage devices 124, and recording deletion of data segments within allocated portions will be described. Illustratively, the interactions of FIG. 2B may occur at any point subsequent to the interactions of FIG. 2A, or may occur independent of the interactions of FIG. 2A. Specifically, at (1), a deletion notification component 104 of the user computing device 102 may transmit a deletion notification to the distributed storage system 120 (e.g., the storage management component 122). As noted above, a deletion notification may correspond to any indication that segments within a thin provisioned data store (e.g., implemented by the storage devices 124) contain invalid data. In one embodiment, the deletion notification may be a TRIM command. In another embodiment, the deletion notification may be a request to write a known pattern of bits to the thin provisioned data store, such as repeating zeros, indicative of invalid data. Thereafter, at (2), the storage management component 122 may determine the segments of the thin provisioned data store corresponding to the deletion notification. Illustratively, where the deletion notification is a TRIM command, the storage management component 122 may determine a number of logical block addresses indicated within the TRIM command. As a further illustration, where the deletion notification is a request to write a known pattern to the thin provisioned data store, the storage management component 122 may determine the written-to segments of the thin provisioned data store.

Subsequent to determining segments indicated within a deletion request, the storage management component 122 may modify metadata associated with the determined segments in order to reflect deletion of the segments by the user computing device 102. In one embodiment, the storage management component 122 can modify a flag associated with each deleted segment in order to reflect that the segment includes invalid data. In another embodiment (not reflected in FIG. 2B), the storage management component 122 may modify the storage devices 124 themselves, rather than metadata within the metadata store 126. For example, the storage management component 122 may overwrite deleted data segments with a known pattern, to reflect that the segments contain invalid data. As described below, indications of data segments containing invalid data may subsequently be used to deallocate portions of the storage devices 124 from thin provisioned data stores.

With reference to FIG. 2C, an illustrative interaction for detecting deletion of data from an allocated portion of storage devices 124 will be described. Illustratively, the interactions of FIG. 2C may occur in instances where a user computing device 102 lacks a deletion notification component 104, but where deletions may otherwise be detected based on actions of the user computing device 102, such as writing of a defined pit pattern associated with invalid data. The interactions of FIG. 2C may occur at any point subsequent to the interactions of FIG. 2A, or may occur independent of the interactions of FIG. 2A. Specifically, at (1), a user computing device 102 may transmit a request to write data to the distributed storage system 120. Thereafter, at (2), the storage management component 122 may detect within the write request one or more instances of a bit pattern indicative of deleted data. For example, the storage management component 122 may detect that at least a portion of data requested to be written corresponds to a series of zeros, indicating that the user computing device 102 desires to securely delete the data previously stored by the written to segments of the storage devices 124. Though repeating series of zeros are discussed herein, one skilled in the art will appreciate that the bit pattern may be any associated with a request to securely delete data, such as repeating zeros, repeating ones, alternating ones and zeros, etc. In some embodiments, detected bit patterns may correspond to any bit pattern repeated with enough frequency to indicate that the pattern is unlikely to represent valid user data.

Subsequent to detecting one or more bit patterns indicative of invalid data within the write request, the storage management component 122 may determine deleted segments corresponding to the bit pattern. For example, the storage management component 122 may determine an address or other identifier of every segment of the storage devices 124 deleted by the write request. Thereafter, in the embodiment discussed with respect to FIG. 2C, the storage management component 122 may modify metadata associated with the determined segments in order to reflect deletion of the segments by the user computing device 102. For example, the storage management component 122 can modify a flag associated with each deleted segment in order to reflect that the segment includes invalid data. Though not shown in FIG. 2C, the distributed storage system 120 may further process the write request to securely delete the corresponding data from the storage devices 124. For example, execution of the write request may ensure that a user's desire to securely delete data is fulfilled.

With reference to FIG. 2D, an illustrative interaction will be described for deallocating portions of the storage devices 124 based on metadata indicating invalid data. Illustratively, the interactions of FIG. 2D may occur at any point subsequent to the interactions of FIG. 2B, or may occur independent of the interactions of FIG. 2B. In some embodiments, the distributed storage system 120 may be configured to implement the interactions of FIG. 2D periodically, such as at predetermined times. In other embodiments, the distributed storage system 120 may be configured to implement the interactions of FIG. 2D in response to specific conditions, such as receiving a threshold number of deletion notifications or allocating a threshold amount or percentage of the storage of storage devices 124. One skilled in the art will appreciate that the distributed storage system 120 may be configured to implement the interactions of FIG. 2D according to any number or combination of criteria.

Specifically, at (1), the storage management component 122 may request metadata from the metadata store 126 reflecting segments of the storage devices 124 containing invalid (e.g., deleted) segments. The metadata store 126 may, in turn, return the requested metadata at (2). Thereafter, the storage management component 122 may analyze the metadata to determine whether any allocated portion of the storage devices 124 contains only invalid data. For example, where the metadata corresponds to flags for each segment (e.g., "block") of the storage devices 124, the storage management component 122 may determine whether any allocated portion corresponds to only segments which are flagged as invalid data.

Thereafter, the storage management component 122 may deallocate any previously allocated portions determined to contain only invalid data. In some embodiments, deallocation may include modification of the storage devices 124 (or other data stores not shown in FIG. 2D) to reflect that the portion is no longer allocated to a user computing device 102, and may be made available for allocation to additional computing devices. Further, deallocation may include modification to the storage devices 124 (or other data stores not shown in FIG. 2D) to reflect that portion to be deallocated was once allocated to a corresponding user computing device 102. Illustratively, a thin provisioned data store corresponding to the user computing device 102 and hosted by the storage devices 124 may be modified to include, in the place of the deallocated portion, a pointer to a known pattern of invalid data (e.g., all zeros). Accordingly, if a user computing device 102 submits a read request corresponding to the deallocated portion, the read request may be serviced by returning the known pattern of invalid data. In this manner, deallocation may be effectively invisible to user computing devices 102.

Though FIG. 2D is described above with respect to inspection of metadata, in some embodiments, the storage management component 122 may additionally or alternatively analyze the storage devices 124 to determine allocated portions containing only invalid data. For example, either the storage management component 122 or a user computing device 122 may be configured to indicate deletion of data based on writing a known pattern of bits, such as repeating zeros. In these embodiments, the storage management component 122 may analyze the storage devices 124 to determine any allocated portion containing only the known pattern. The storage management component 122 may thereafter deallocate the determined portion, as described above.

With reference to FIG. 2E, an illustrative interaction will be described for deallocating portions of the storage devices 124 based on detection of bit patterns indicating invalid data. Illustratively, the interactions of FIG. 2E may occur periodically, such as at predetermined times. In other embodiments, the distributed storage system 120 may be configured to implement the interactions of FIG. 2E in response to specific conditions, such as allocating a threshold amount or percentage of the storage of storage devices 124. One skilled in the art will appreciate that the distributed storage system 120 may be configured to implement the interactions of FIG. 2E according to any number or combination of criteria.

Specifically, at (1'), the storage management component 122 may request data from the storage devices 124 corresponding to data within one or more allocated portions of the storage devices 124. At (2'), the requested data may be returned to the storage management component 122 for subsequent analysis. The storage management component 122 may further, at (1"), request metadata corresponding to the one or more allocated portions from the metadata store 126, which may be returned from the metadata store at (2"). Illustratively, the requested metadata may identify a mapping of segments within storage devices 124 to the one or more allocated portions of the storage devices 124, such that individual segments of the one or more allocation portions may be determined. As will be appreciated by ones skilled in the art, the interactions of (1') and (1") and of (2') and (2") may occur simultaneously or in any order. Subsequent to receiving data of the one or more allocated portions and metadata of the allocated portions, the storage management component 122, at (3), analyzes the returned data and metadata to determine whether any allocated portion of the storage devices 124 contains only invalid data. Illustratively, the storage management component 122 may make a determination as to whether each segment of any allocated portion contains a known bit pattern associated with invalid data (e.g., repeating zeros), or is indicated within the received metadata to otherwise be invalid.

At (4), the storage management component 122 may deallocate any allocated portions determined to contain only invalid data. In some embodiments, deallocation may include modification of the metadata store 126 (or other data stores not shown in FIG. 2E) to reflect that the portion is no longer allocated to a user computing device 102, and may be made available for allocation to additional computing devices.

In some embodiments, metadata corresponding to the deallocated portion may be modified to indicate deallocation of the portion. For example, metadata may be generated or modified to reflect the bit pattern within one or more segments of a portion prior to deallocation. Illustratively, a deallocation indicator may be generated and stored, at (5), reflecting that, prior to deallocation, each segment within a portion included only repeating zeros. Such an indicator may be utilized, for example, to satisfy requests of user computing devices 102 for deallocated portions. As will be described in more detail below, if a user requests data of a deallocated portion, a deallocation indicator may be utilized in some instances to recreate the data within the portion as it existed prior to deallocation. Utilizing such deallocation indicators may therefore decrease the likelihood that user computing devices 102 are able to detect deallocation of storage portions, or experience loss of data due to such deallocation.

With reference to FIG. 2F, an illustrative interaction will be described for fulfilling a request of a user computing device 102 for data within a deallocated portion of the storage devices 124. For example, the interactions of FIG. 2F may occur subsequent to deallocation of a portion of storage devices 124 that was determined to include exclusively a bit pattern indicative of invalid data (e.g., as described above with respect to FIG. 2E). Illustratively, in some instances, the distributed storage system 120 may determine that a portion of the storage devices 124 includes only a defined bit pattern (e.g., repeating zeros) indicative of invalid data. However, it is possible that a user computing device 102 might still consider the portion to contain valid data. Accordingly, at (1), a user computing device 102 may request to read a previously deallocated portion (which the user computing device 102 would expect to include a previously written bit pattern) from the storage management component 122. Because the portion corresponding to the request was previously deallocated, it may not be possible to satisfy the request by directly reading data of the portion. Accordingly, in order to satisfy the request, the storage management component 122 may, at (2), request metadata associated with the deallocated portion from the metadata store 126. Because the portion was deallocated in response to detection of a defined bit pattern, metadata of the portion may include a deallocation indicator. As discussed above with respect to FIG. 2E, the indicator may include one or more bit patterns previously detected within the portion, as well as the specific segments in which each bit pattern was detected. For example, a deallocation indicator may reflect that, prior to deallocation, a portion included ten consecutive segments of repeating zeros and ten consecutive segments of repeating ones. The deallocation indicator may be returned to the storage management component 122 at (3). Thereafter, the storage management component 122, at (4) may utilize the deallocation indicator to generate the data requested by the user computing device 102. For example, where the deallocation indicator reflects that, prior to deallocation, a portion included ten consecutive segments of repeating zeros and ten consecutive segments of repeating ones, the storage management component 122 may generate data comprising ten consecutive segments of repeating zeros and ten consecutive segments of repeating ones. At (5), the requested data may be returned to the user computing device 102. Accordingly, user requests for data may be satisfied even after a portion containing the requested data has been deallocated.

Figure 3:
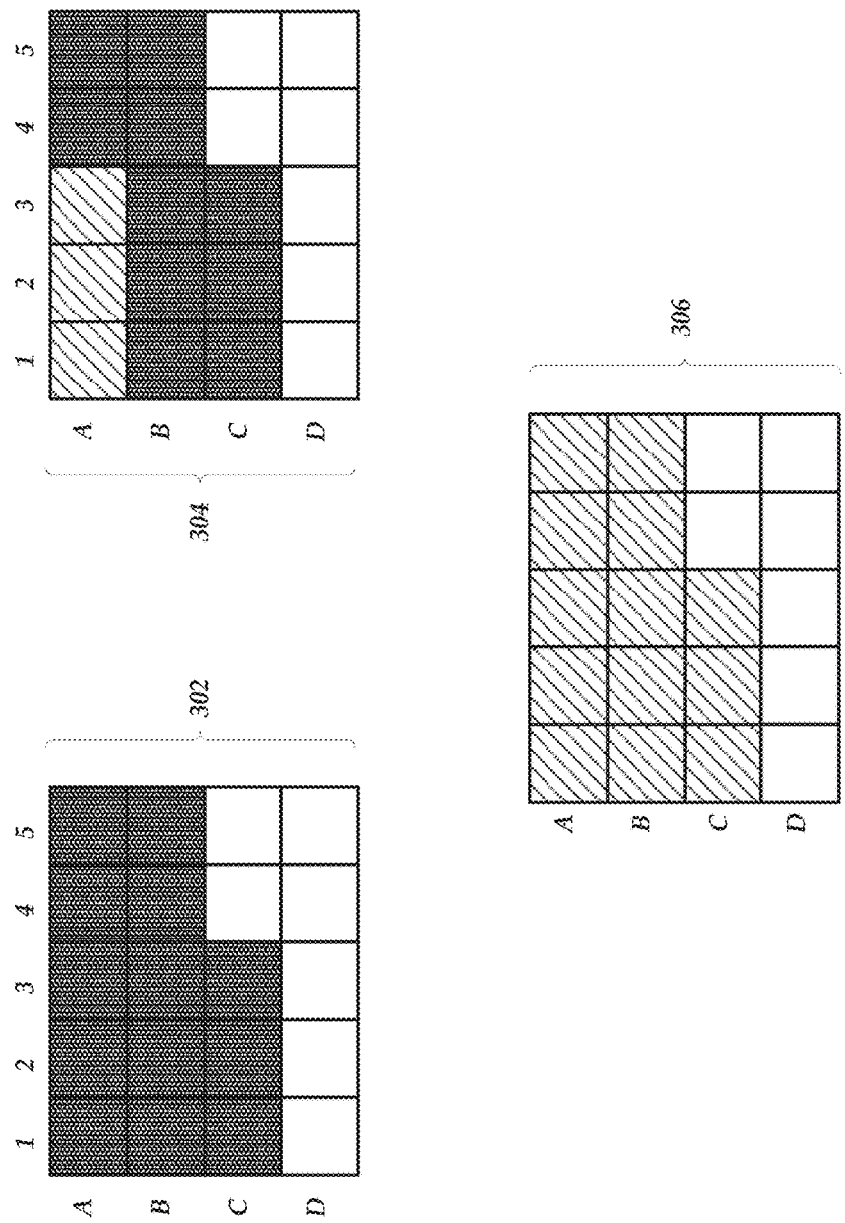
FIG. 3 is an illustrative graphical representation or visualization of a storage portion allocated to a thin provisioned virtual data store by the distributed storage system of FIG. 1 corresponding to various user interactions.

With reference to FIG. 3, an illustrative graphical representation or visualization of various states of an allocated portion of the storage devices 124 of FIG. 1 will be described. The illustrations 302-306 each represent a portion of the storage devices 124 that may be allocated to a user computing device 102 as part of a thin provisioned data store. Specifically, the illustrations 302-306 represent such an allocatable portion according to a number of potential states. The illustrations 302-306 may represent, for example, a predefined "chunk" of storage within the storage devices 124. In addition, portions represented by illustrations 302-306 may include a number of addressable data segments, each indicated by their respective row and column within the illustrations 302-306. For example, the segment at row A, column 1 may indicate a first addressable data segment, hereinafter referred to as segment A1. Similarly, the segment at row A, column 2 may indicate a second addressable data segment A2; the segment at row A, column 3 may indicate a third addressable data segment A3; etc. Each addressable data segment A1-D5 may correspond to a segment utilized by a user computing device 102 in interacting with the allocated portion (e.g., as contained within a thin provisioned data store). For example, addressable data segments A1-D5 may correspond to "blocks" of the thin provisioned data store. Accordingly, modifications to the thin provisioned data store may occur at a segment level, rather than with respect to entire allocated portions.

With reference to illustration 302, a representation of an allocated portion is shown subsequent to writing of data to the portion (e.g., by a user computing device 102). Specifically, the illustration 302 may represent the allocated portion subsequent to data being written to segments A1-A5, B1-B5 and C1-C3. Illustration 302 may represent the allocated portion just subsequent to allocation of the portion to a user computing device 102 (e.g., in response to the request to write the data now contained in segments A1-A5, B1-B5 and C1-C3). Shading of segments within the illustration 302 may correspond to the validity of data within the segment. For example, the shading of segments A1-A5, B1-B5 and C1-C3 within the illustration 302 may indicate the segments contain valid data (e.g., a known pattern such as repeating zeros, or random data). The lack of shading of segments C4, C5 and D1-D5 may indicate that the segments contain invalid data (e.g., they have not yet been written to by the user computing device 102). As noted above, in some embodiments, each segment of an allocated portion may be associated with metadata indicating the validity of data within the segment. Accordingly, metadata may correspond to an array of bits A1-D5, each bit indicating the validity of a corresponding segment A1-D5. Illustratively, in an array corresponding to illustration 302, metadata bit A1 would indicate valid data exists within segment A1, while metadata bit D1 would indicate that invalid data exists within segment D1, etc.

Illustration 304 represents the allocated portion discussed above at a second point in time. Specifically, illustration 304 represents the allocated portion subsequent to reception of a deletion notification indicating data segments A1-A3 have been deleted by the user computing device 102. In one embodiment, such a deletion notification may correspond to a TRIM command indicating that segments A1-A3 contain invalid data. In another embodiment, such a deletion notification may include a write request to overwrite segments A1-A3 with a known repeating pattern. Diagonal lining is used in illustration 304 to indicate the presence of deleted data within segments A1-A3. In some embodiments, deletion of data within segments A1-A3 may be reflected only within metadata corresponding to the segments, without modification to the data within the segments themselves. In other embodiments, deletion of data within segments A1-A3 may result in overwriting of data within the segments. While segments A1-A3 may be distinguished from other segments containing invalid data (e.g., segments C4, C5 and D1-D5) for the purposes of discussion, embodiments of the present disclosure may treat deleted segments and segments never written as similar or identical for deallocation purposes.

Illustration 306 represents the allocated portion discussed above at a third point in time. Specifically, illustration 306 represents the allocated portion subsequent to reception of a deletion notification indicating data segments A4, A5, B1-B5 and C1-C3 have been deleted by the user computing device 102. As noted above, such a deletion notification may correspond, for example, to a TRIM command received from a user computing device 102, or a write request requesting invalid data be written to the segments A4, A5, B1-B5 and C1-C3. Accordingly, at the point of time associated with illustration 306, the represented allocated portion contains only invalid data. Due to this, the portion may be deallocated to the user computing device 102, thereby increasing portions available for allocation to other computing devices.

Figure 4:
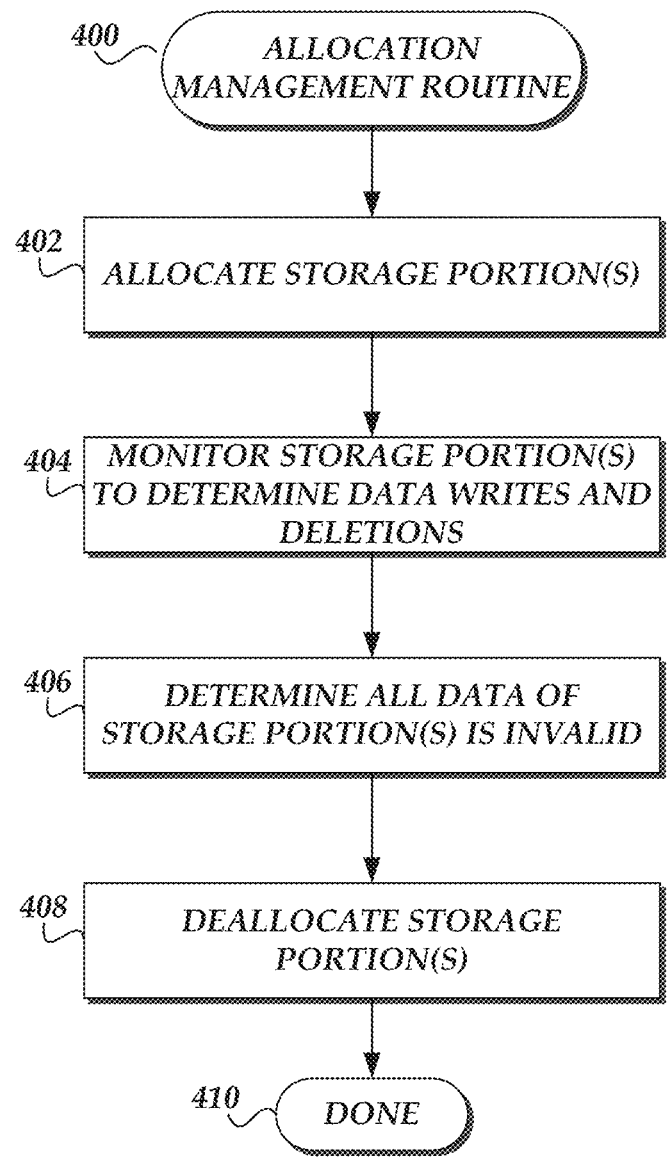
FIG. 4 is a flow diagram depicting an illustrative routine for monitoring a thin provisioned virtual data store and deallocating storage portions of the data store based on a detection that the storage portions contain invalid data.

FIG. 4 is one example of an illustrative routine 400 for managing thin provisioned data stores, including deallocation of portions of such data stores containing only invalid data. The routine 400 may be implemented by the distributed storage system 120 in order to manage thin provisioned data stores (e.g., provided by the storage devices 124 in conjunction with the storage management component 122). The routine 400 may begin at block 402, where the distributed storage system 120 may allocate one or more portions of the storage devices 124 to a user computing device 102 as a thin provisioned data store (or a portion thereof). In some embodiments, the portions of the storage devices 124 may be allocated in response to a write request from the user computing device 102 (e.g., to store data within the thin provisioned data store). In allocating the one or more portions, the distributed storage system acquires information identifying the one or more portions of the storage devices 124 allocated to the user computing device 102. The allocated portions of the storage devices 124 may be determined, for example, based on a predetermined allocated portion size. For example, the distributed storage system 120 may allocate as many 4MB portions as are required to store the data within a user's write request.

Subsequently, at block 404, the distributed storage system 120 may monitor interactions with the allocated portion by the user computing device 102. Specifically, the distributed storage system 120 may monitor any modifications to the allocated portions, as represented by writes to the allocated portion or deletion notifications corresponding to the allocated portion. In some embodiments, the distributed storage system 120 may monitor writes to segments within the allocated portions, and record that such segments include valid data (e.g., by modifying metadata associated with the written-to segments). In instances where a user computing device 102 is configured to record invalid data within a known repeating pattern, such writes may not be considered as indicative of valid data by the distributed storage system 120. In other embodiments, the distributed storage system 120 may be configured to identify valid data based on the data itself. For example, the distributed storage 120 may be configured to identify segments containing known patterns (such as all zeros) as containing invalid data, and all other segments as containing valid data. In such embodiments, it may be unnecessary for the distributed storage system 120 to monitor writes to the allocated portions. Further, the distributed storage system 120 may monitor deletion notifications received from a user computing device 102 and associated with the allocated portions. Deletion notifications may corresp, for example, to TRIM commands, write requests for known patterns of invalid data, or other indications that segments of the allocated portions no longer contain valid data.

Thereafter, at block 406, the distributed storage system 120 may determine that all data within the one or more allocated portions is invalid. Illustratively, block 406 may occur in response to analysis of the allocated portions (e.g., executed periodically or in response to execution criteria). Generally, block 406 may correspond to a determination that any individual or group of allocated portions contains only invalid data, regardless of whether the determined allocation portions were allocated at the same time or at different times.

In some embodiments, a determination that data of one or more allocated portions contain invalid data may be facilitated in whole or in part by metadata indicative of the validity of data within the allocated portion. For example, metadata indicative of data validity may be maintained for each addressable segment within the allocated portions. Accordingly, where each segment within an allocated portion is associated with metadata indicating invalid data, the allocated portion may be considered to contain only invalid data.

In another embodiment, a determination that data of one or more allocated portions contain invalid data may be facilitated in whole or in part by analysis of the allocated portion itself. For example, the distributed storage system 122 or the user computing device 102 may be configured to overwrite invalid data (e.g., as indicated by a deletion notification) with a known pattern. Accordingly, the distributed storage system 122 may determine that an allocated portion includes only invalid data by determining that all segments within the allocated portion conform to one or more known patterns.

In still more embodiments, a determination that data of one or more allocated portions contain invalid data may be facilitated based on a combination of inspection of metadata and analysis of the portion itself. For example, the distributed storage system 120 may provide services to a variety of computing devices 102 employing distinct mechanisms for deletion notifications. Illustratively, a first set of computing devices may transmit deletion notifications as TRIM commands; while a second set of computing devices may transmit such notifications as write requests for a known pattern. In some such instances, the distributed storage system 120 may be configured to update metadata based on specific types of deletion notifications (e.g., TRIM commands) but not based on other types of deletion notifications (e.g., pattern writes). Accordingly, determining that allocated portions contain invalid data may include determining that all segments of the allocated portion are indicated as invalid by either metadata or data written within the segments.

Subsequently, at block 408, segments determined to contain only invalid data may be deallocated from a thin provisioned data store. As noted above, such deallocation may involve modification to the storage devices 124 or other components of the distributed storage system 120 to reflect that the previously allocated portion is no longer allocated to the thin provisioned data store. Further, in some instances, pointers may be created within a thin provisioned data store in place of the deallocated portion (e.g., to point to invalid data). In this manner, a request to read data from the previously allocated portion may return invalid data, as may be expected by a requesting user computing device 102. Utilization of such pointers may ensure data integrity, even after deallocation of a portion. Thereafter, the routine 400 may end at block 410.

By implementation of the routine 400, allocated portions that no longer contain valid data may be reclaimed by the distributed storage system 120, thereby reducing the total storage space required to support a number of thin provisioned storage devices. In addition, by implementation of the routine 400, such reclamation may occur in response to a number of deletion notification types, or combination of deletion notification types. Still further, implementation of the routine 400 may enable reclamation independent of the segments addressed within deletion notifications or the sizing of allocated portions.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each is present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
   physical memory comprising computer-executable instructions; and
   one or more processors to execute the computer-executable instructions, wherein execution of the computer-executable instructions causes the one or more processors to:
   acquire information identifying a portion of a storage device allocated to a client computing device, wherein the portion comprises a plurality of independently writable subportions;

obtain a first deletion notification identifying a first independently writable subportion, of the plurality of independently writable subportions, as containing invalid data;

detect that a remainder of the plurality of independently writable subportions, excluding the first independently writable subportion, contain invalid data; and deallocate the portion of the storage device only when both the first independently writable subportion and the remainder of the plurality of independently writable subportions contain invalid data.

2. The system of claim 1, wherein the plurality of independently writable subportions are blocks of the storage device.

3. The system of claim 1, wherein the first deletion notification is at least one of a TRIM command or a request to write a defined bit pattern indicative of invalid data to the first independently writable subportion.

4. The system of claim 1, wherein execution of the computer-executable instructions further causes the one or more processors to store information identifying the first independently writable subportion as containing invalid data.

5. The system of claim 4, wherein the information is at least one of a defined bit pattern stored within the first independently writable subportion or metadata regarding the first independently writable subportion.

6. The system of claim 1, wherein the storage device is a virtual storage device hosted by at least one physical storage device.

7. A computer-implemented method comprising:
acquiring information identifying a portion of a storage device allocated to a client computing device, wherein the portion comprises a plurality of independently writable subportions;

obtaining a first deletion notification identifying a first independently writable subportion, of the plurality of independently writable subportions, as containing invalid data;

detecting that a remainder of the plurality of independently writable subportions, excluding the first independently writable subportion, contain invalid data; and deallocating the portion of the storage device based on the detection that the remainder of the plurality of independently writable subportions contain invalid data.

8. The computer-implemented method of claim 7, wherein detecting that a remainder of the plurality of independently writable subportions, excluding the first independently writable subportion, contain invalid data comprises receiving a second deletion notification identifying a second independently writable subportion, of the remainder of the plurality of independently writable subportions, as containing invalid data, and wherein deallocating the portion of the storage device occurs only after receiving both the first deletion notification and the second deletion notification.

9. The computer-implemented method of claim 8, wherein the second deletion notification comprises at least one of a TRIM command or a request to write a defined bit pattern to the second independently writable subportion.

10. The computer-implemented method of claim 7, wherein detecting that a remainder of the plurality of independently writable subportions, excluding the first independently writable subportion, contain invalid data comprises analyzing data stored within a second independently writable subportion, of the remainder of the plurality of independently writable subportions, to detect that the data stored within the second independently writable subportion corresponds to a defined bit pattern indicative of invalid data.

11. The computer-implemented method of claim 7, wherein detecting that a remainder of the plurality of independently writable subportions, excluding the first independently writable subportion, contain invalid data comprises analyzing metadata that indicates that a second independently writable subportion, of the remainder of the plurality of independently writable subportions, contains invalid data.

12. The computer-implemented method of claim 7 further comprising:
acquiring information identifying a second portion of the storage device allocated to a second client computing device, wherein the second portion comprises a second plurality of independently writable subportions;

obtaining a second deletion notification identifying a second independently writable subportion, of the second plurality of independently writable subportions, as containing invalid data;

detecting that a remainder of the second plurality of independently writable subportions, excluding the second independently writable subportion, contain invalid data; and deallocating the second portion of the storage device only when both the second independently writable subportion and the remainder of the second plurality of independently writable subportions contain invalid data.

13. The computer-implemented method of claim 7, wherein the plurality of independently writable subportions are included within a virtual data store associated with a reported capacity greater than an actual capacity allocated to the virtual data store.

14. Non-transitory computer-readable storage media comprising computer-executable instructions that, when executed by at least one processor of a computing system, cause the computing system to implement operations comprising:
acquiring a first deletion notification identifying a first independently writable subportion, of a plurality of independently writable subportions corresponding to allocated storage of a storage device, as containing invalid data;

detecting that a remainder of the plurality of independently writable subportions, excluding the first independently writable subportion, contain invalid data; and deallocating the allocated storage of the storage device responsive to detecting that the allocated storage includes all invalid data.

15. The non-transitory computer-readable storage media of claim 14, wherein the computer-executable instructions when executed further cause the computing system, while the first independently writable subportion continues to be allocated, to:
receive a request to read data from the first independently writable subportion; and respond to the request by returning data comprising a defined bit pattern indicative of invalid data.

16. The non-transitory computer-readable storage media of claim 15, wherein the data comprising the defined bit pattern indicative of invalid data is read from the first independently writable subportion while the first independently writable subportion continues to be allocated to a client computing device.

17. The non-transitory computer-readable storage media of claim 15, wherein the data comprising the defined bit pattern indicative of invalid data is generated independently from information stored within the storage device.

18. The non-transitory computer-readable storage media of claim 14, wherein the computer-executable instructions when executed further cause the computing system to store information identifying the first independently writable subportion as containing invalid data.

19. The non-transitory computer-readable storage media of claim 18, wherein the information is at least one of a defined bit pattern stored within the first independently writable subportion or metadata regarding the first independently writable subportion.

20. The non-transitory computer-readable storage media of claim 14, wherein detecting that a remainder of the plurality of independently writable subportions, excluding the first independently writable subportion, contain invalid data comprises at least one of receiving a second deletion notification identifying a second independently writable subportion, detecting that data stored within a second independently writable subportion corresponds to a defined bit pattern indicative of invalid data, or detecting that metadata regarding a second independently writable subportion indicates that the second independently writable subportion contains invalid data.

* * * * *